A. J. KUSTERER & C. SANDERS.
BOX MAKING MACHINE.
APPLICATION FILED JULY 13, 1917.

1,282,597.

Patented Oct. 22, 1918.
9 SHEETS—SHEET 3.

INVENTORS
Aloysius J. Kusterer
and Charles Sanders

Attorneys

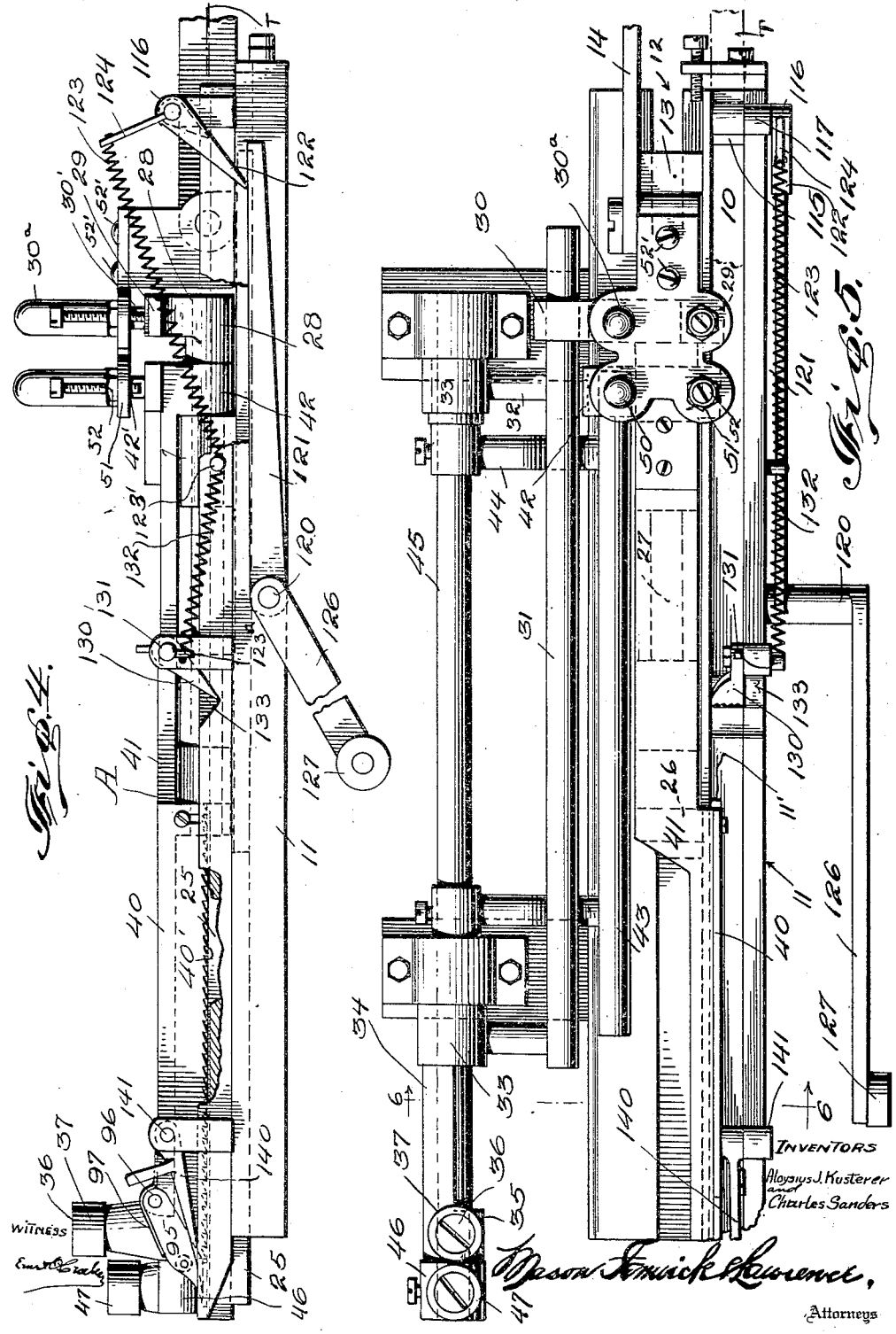

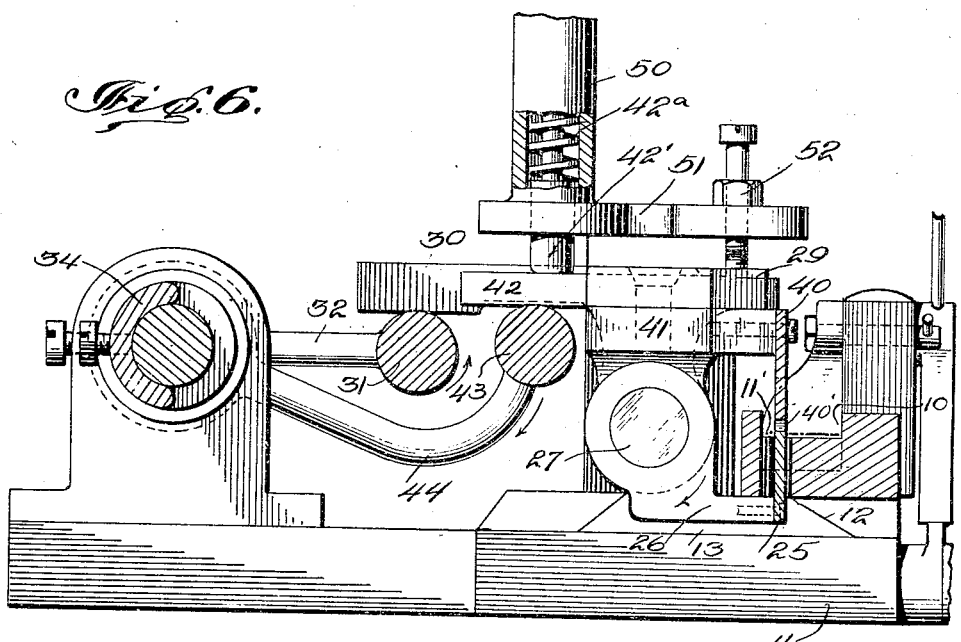

A. J. KUSTERER & C. SANDERS.
BOX MAKING MACHINE.
APPLICATION FILED JULY 13, 1917.
1,282,597.
Patented Oct. 22, 1918.
9 SHEETS—SHEET 6.
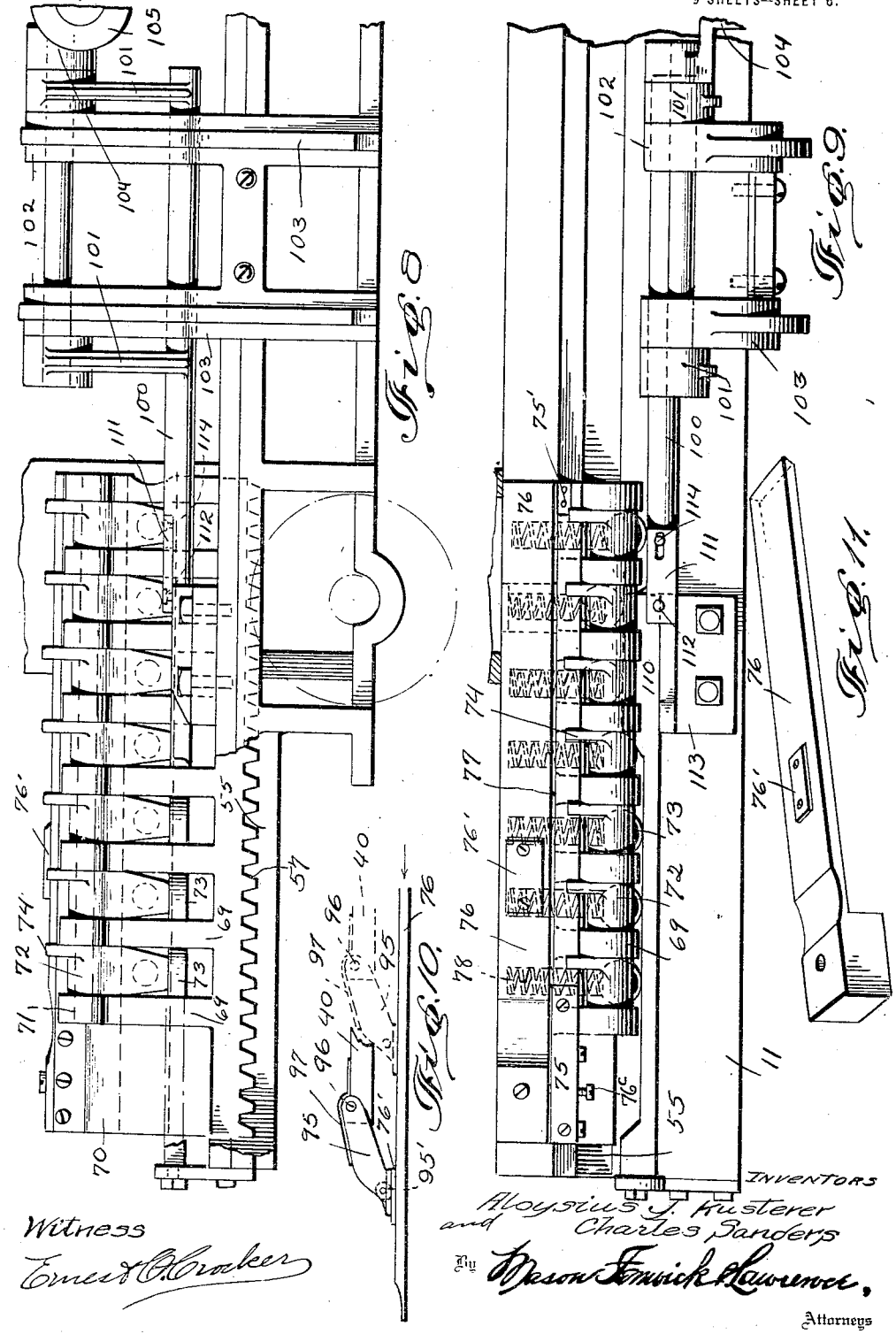
Witness
Ernest O. Crocker
INVENTORS
Aloysius J. Kusterer
and Charles Sanders
By Mason Fenwick Lawrence,
Attorneys A. J. KUSTERER & C. SANDERS.
BOX MAKING MACHINE.
APPLICATION FILED JULY 13, 1917.
1,282,597.
Patented Oct. 22, 1918.
9 SHEETS—SHEET 7.
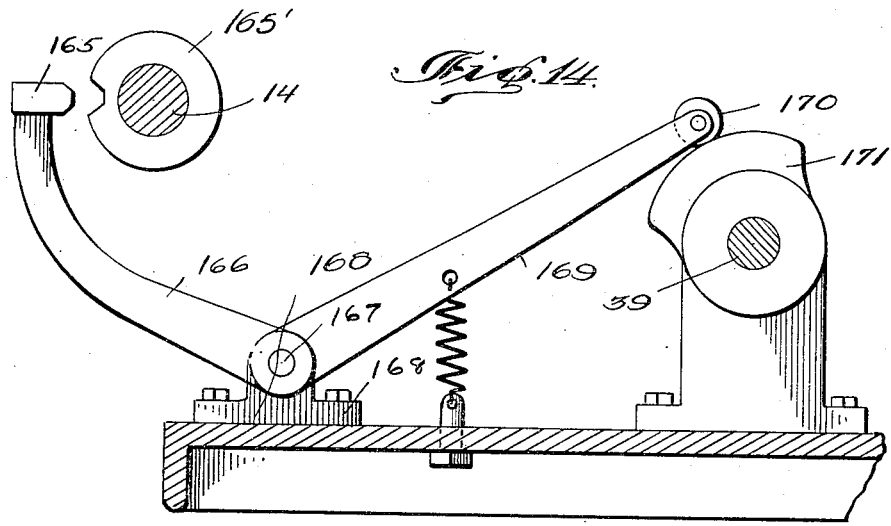
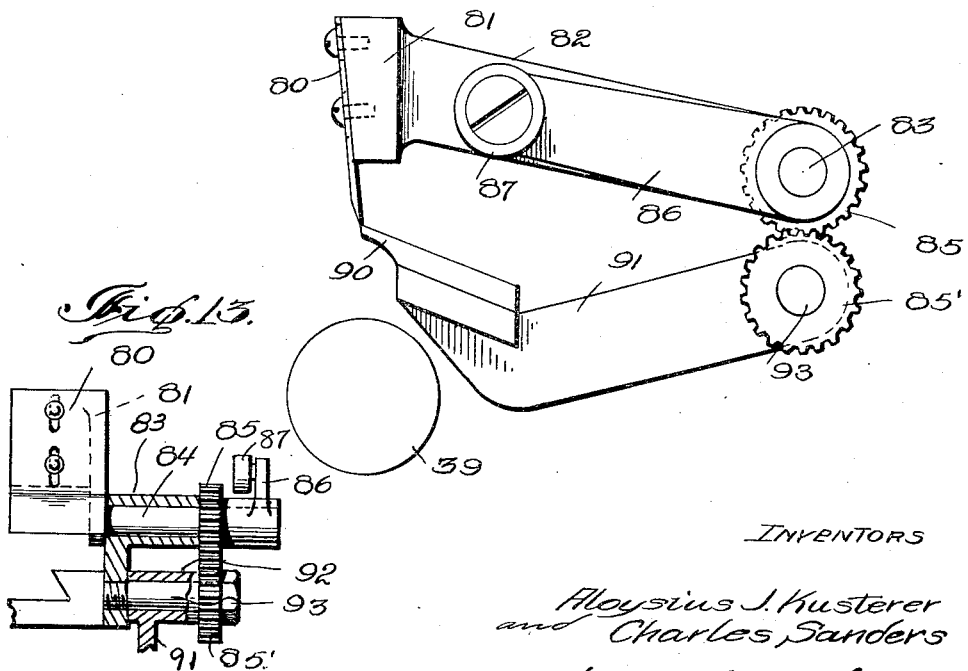

A. J. KUSTERER & C. SANDERS.
BOX MAKING MACHINE.
APPLICATION FILED JULY 13, 1917.
1,282,597.
Patented Oct. 22, 1918.
9 SHEETS—SHEET 8.
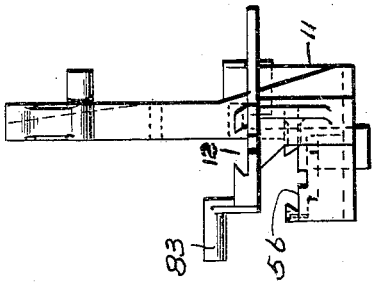
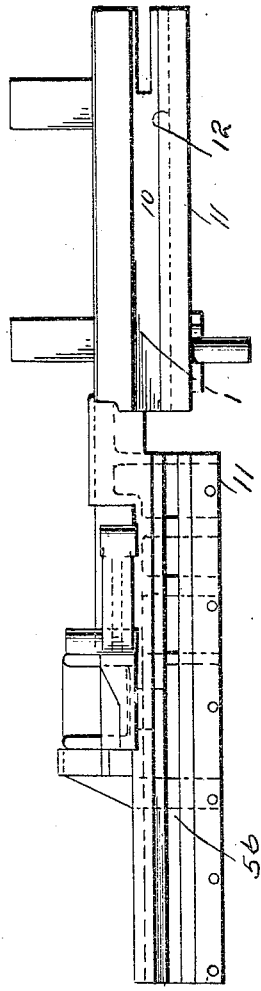
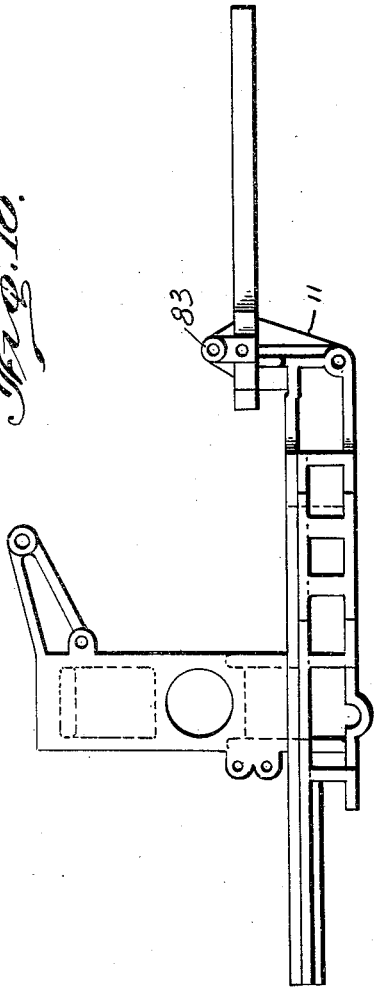
INVENTORS
Aloysius J. Kusterer
and Charles Sanders.
By Mason Fenwick & Lawrence,
Attorneys
Witness
Ernest C. Crocker

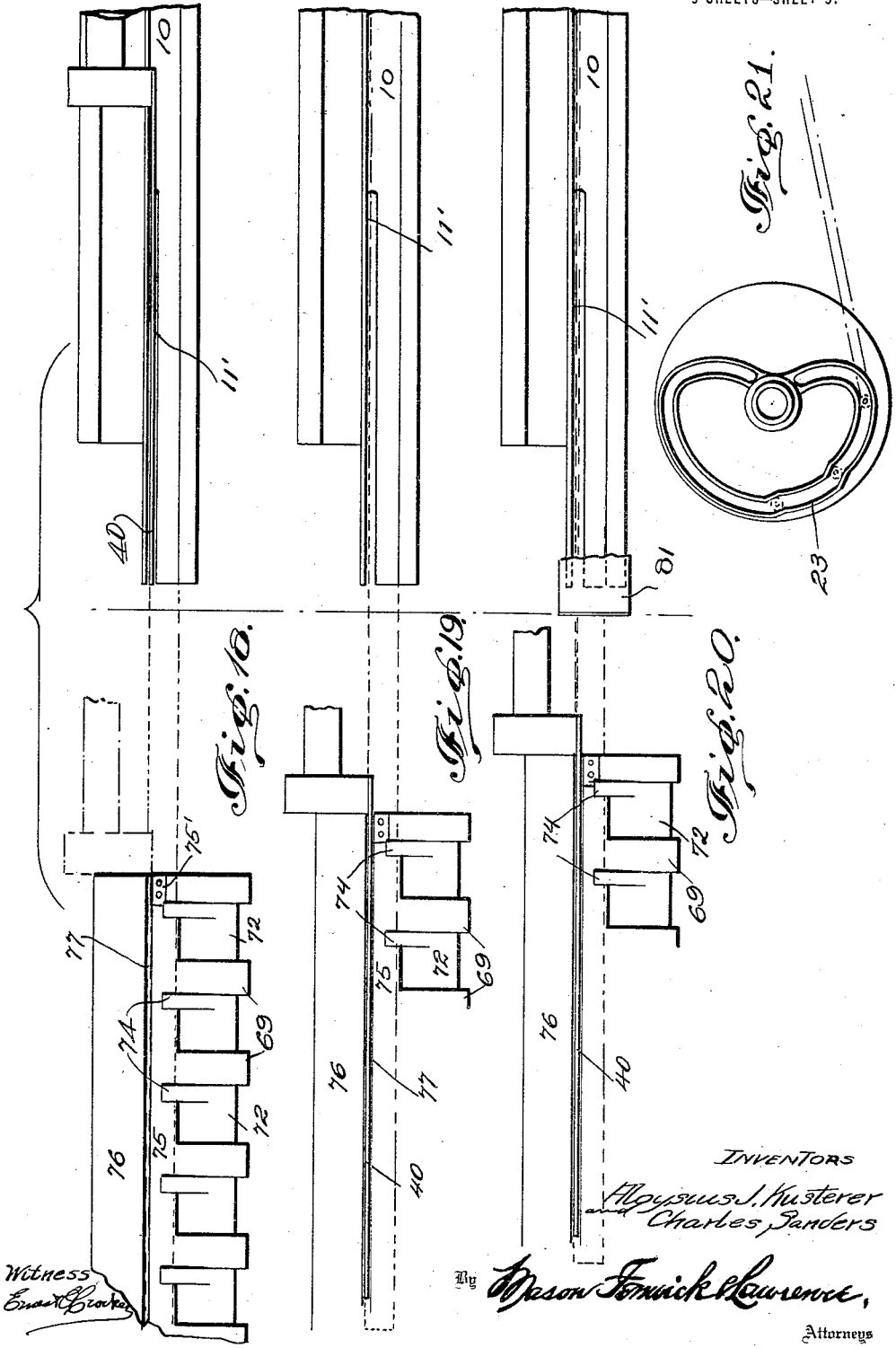

UNITED STATES PATENT OFFICE.

ALOYSIUS JOSEPH KUSTERER, OF RICHMOND, AND CHARLES SANDERS, OF SOUTH RICHMOND, VIRGINIA, ASSIGNORS TO THE RANDOLPH PAPER BOX COMPANY, OF RICHMOND, VIRGINIA, A CORPORATION OF VIRGINIA.

BOX-MAKING MACHINE.

1,282,597.  Specification of Letters Patent.  Patented Oct. 22, 1918.

Application filed July 13, 1917. Serial No. 180,404.

*To all whom it may concern:*

Be it known that we, ALOYSIUS JOSEPH KUSTERER and CHARLES SANDERS, citizens of the United States, residing at Richmond, in the county of Henrico and State of Virginia, and South Richmond, in the county of Chesterfield and State of Virginia, respectively, have invented certain new and useful Improvements in Box-Making Machines; and we do hereby declare the following to be a full, clear, and exact description of the invention, such as will enable others skilled in the art to which it appertains to make and use the same.

This invention relates to machines for the automatic manufacture of what are known as French edge round paper boxes, and more particularly to that type of automatic means for assembling the rings and bottom disks of the box in proper relative position and applying thereto a tape or web which is gummed on one side to be affixed to the circumference of the band or ring and cover the projecting bead where the rim extends beyond the ring. One edge of the laterally projecting tape is turned over and ironed to the bottom of the box and the other edge to be turned into the open side of the box and ironed thereto. Particularly the present invention is an improvement in the type of machine invented by Burl H. Smith and as set forth in Letters Patent No. 1,006,885, patented October 24, 1911, to which reference is made for details of mechanism for the assembling of the rings and bottoms or disks of the bottom in proper position, the present invention having for its object to improve the mechanism for feeding, cutting and affixing the tape to the assembled box sections, and reference is had particularly to the above-named patent for details relating to the box member assembling mechanism in which no improvement is contemplated in the present application. As the bottom of the box is of greater diameter than the ring, when these are centered to receive the tape or web there is formed an extension edge and therefore the rim or edge of the bottom requires a greater length of tape than does the smaller ring perimeter. It is therefore an important object of this invention to provide for the stretching of the tape while the box is rotated and the tape is affixed. To that end means are provided to hold the tape securely up to the moment of application to the box.

A further object of the present invention is to provide for the true alinement of the tape, after it has been gummed, with the ring and disk applied thereto in the form of a box section, to provide further for the control, continuously through the operation of the machine, of the tape to be affixed to the box so that the tape and sections cut therefrom are guided in true alinement to the box section to be covered, and it is a further object of the present invention to provide improvements in the advancing mechanism and in the means for affixing the tape to the box and which incorporates features designed to continuously and positively hold the strip in true alinement with the box while it is being affixed thereto.

A further object of the invention is to provide means for preventing the jamming of the strip of tape as it is advanced to the affixing and box binding mechanism, to provide means to take out slack of the tape during its application to the box, to prevent wrinkling in the strip of tape; to so control the tape that it cannot be diagonally drawn and disalined with relation to the box so that it will be affixed thereto in substantially true circumferential position, and further it is an object of the invention to provide for the final crimping of the tape at the overlapping end thereof at what is known as the horn where the trailing end of the binding tape is laid upon the box.

With these and other objects in view the invention consists in novel means for alining the continuous strip of tape with the affixing mechanism, and further consists in means for positively gripping the tape at parallel positions on opposite sides of its surface and longitudinally of its length so as to prevent disalinement during the transfer from the guide to an affixing device, and further consists in novel and improved means for affixing the tape to the box, and which comprises devices for positively holding the strip up to the point of its actual application to the box being bound, and further consists in means for crimping the trailing end or horn of the tape on the box.

With these and other objects in view as will be hereinafter set forth, the invention is described in the following specification as organized with a type of machine fully disclosed in the aforesaid Letters Patent No. 1,006,885, and which is illustrated in the accompanying drawings, wherein:

Fig. 4 is an enlarged detail view partly broken away and showing the construction of the guide and movable vise structure.

Fig. 5 is a plan view of the same.

Fig. 6 is a detail cross sectional view of the tape guide and vise jaws and vise operating mechanism taken on line 6—6 of Fig. 5.

Fig. 7 is an enlarged detail sectional view showing in end elevation the affixing mechanism and showing in dotted lines one position of the clamps thereon.

Fig. 8 is a detail sectional side elevation of the frame supporting the affixer and the affixer mounted thereon and disclosing the affixer rack.

Fig. 9 is a plan view substantially of Fig. 8, showing the affixer in its advanced position with respect to the affixing position of the mechanism.

Fig. 10 is a detail diagrammatic view illustrating the respective positions of the smoother device as lifted from the surface of the adjacent affixer and showing in dotted lines the position of the smoother released to rest upon the surface of the affixer.

Fig. 11 is a detail perspective view showing the detachable affixer plate with the smoother lifting cam thereof.

Fig. 12 is a detail view showing the tape cutting knives in side elevation.

Fig. 13 is a detail sectional view showing the mounting or support for the cutter arms and their actuating pinions.

Fig. 14 is a sectional detail showing in side elevation the mechanism for controlling the rotation of the mandrel.

Figs. 15, 16 and 17 are detail views of the top table for carrying the vise slide and the affixer slide, and also illustrating the vertical standard to receive the disk feed slide.

Figs. 18, 19 and 20 illustrate diagrammatically respective positions of the vise and the affixer mechanism, in Fig. 18 these parts being shown in respective separate position, in Fig. 19 being shown in relative approached position and in which position the affixer clamps are released to engage the tape laid thereon by the vise, and in Fig. 20 illustrating the position of these parts at the moment the tape is cut by the knives.

Fig. 21 is a detail view of the cam for controlling the motion of the vise and in part of the affixer.

Figure 1:
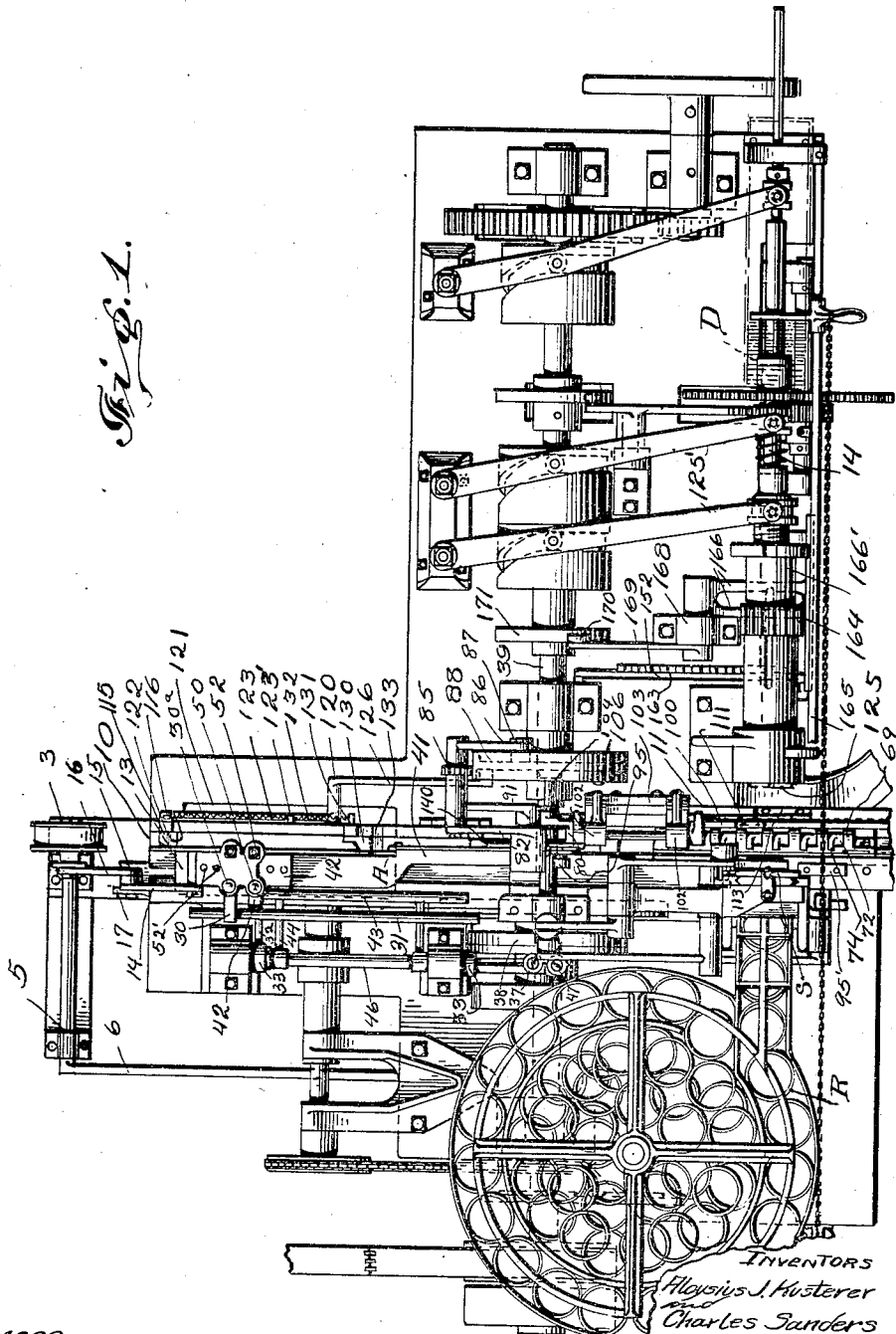
Figure 1 is a plan view of the machine.
Figure 2:
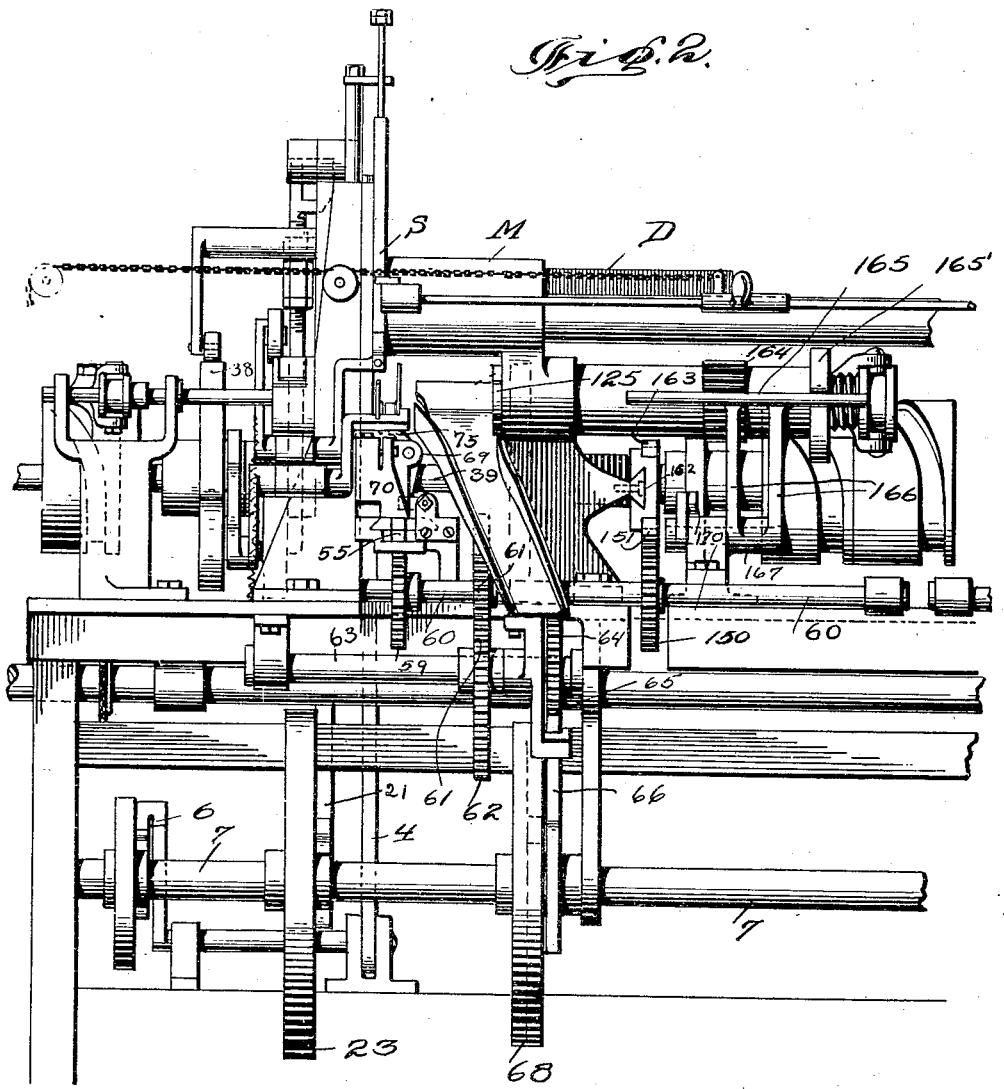
Fig. 2 is a front elevation on a slightly larger scale showing in more detail the driving mechanism for rotating the ring mandrel and for simultaneously actuating the affixing device.
Figure 3:
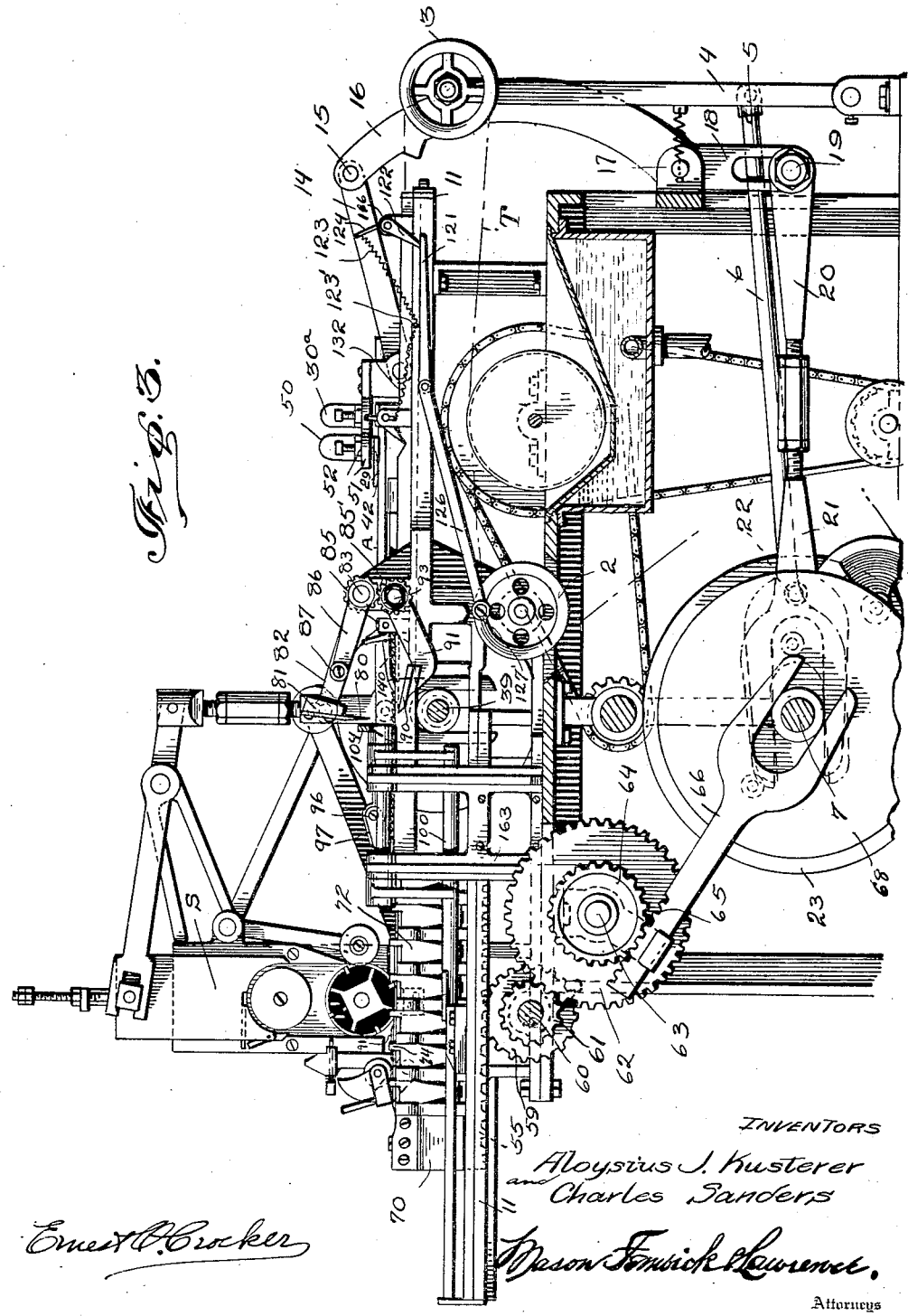
Fig. 3 is a vertical transverse section through the machine in a plane approximately parallel to the vise guide and affixer supporting frame.

As before stated, the present invention relates particularly to improvements in means for feeding gummed tape to affixing means, the latter operative to affix the tape to a box section composed of a disk D, Fig. 2, which may be fed from a magazine M through a suitable slide or conveying mechanism S, Fig. 3, downwardly to be alined axially with a ring section R to be conveyed by any suitable feed mechanism shown in Fig. 1 to a position in alinement with a mandrel 125, Fig. 2, these several parts being fully disclosed in Letters Patent No. 1,006,885, and which need not be herein more particularly described. The assembled ring and disk are adapted to be circumferentially bound by a strip of tape of suitable material and which may be composed of plural layers, as, for instance, a binding strip, a color strip, and sometimes a finish or trimming strip, the tape being led from any suitable tape-forming or gumming mechanism, not here shown, but disclosed in U. S. Patents Nos. 1,218,417 and 1,218,418, and extending from this mechanism over a suitable tape guide 2, Fig. 3, thence rearwardly to a carrier wheel 3 which is moutned upon the upper end of a feed lever 4 connected at 5 to a link 6 extending beneath the frame of the machine and carrying a yoke arm adapted to engage a respective cam mounted on a cam shaft 7. The operation of this mechanism is to intermittently draw a piece of the tape T forwardly as required and which is thence lead over the top of the roller 3 into a guide 10, Figs. 1 and 5, the function of which is to properly aline and retain in alinement the tape as it moves toward the assembled sections of the box carried by the mandrel 125 when the latter is moved into position with relation to the downwardly lowered slide S carrying a bottom or disk of a box section.

The guide 10 is shown as formed in a portion of a suitable framework 11, illustrated in detail in Figs. 15, 16 and 17, and which latter is provided with a dove-tailed channel-way 12 in which there is adapted to run a suitable slide 13 this being attached to an operating link 14, the rear end of which is connected at 15 to the upper end of a lever 16 pivoted at 17 upon the main framework of the machine and having a downwardly extending arm 18 which is connected at 19 to a horizontally extending connecting link 20 which is provided with a yoke 21 straddling the cam shaft 7 and having a cam roller 22 operative by means of a suitable cam 23, Fig. 2.

The guide 10 extends for a suitable distance along the frame 11 and is provided with a vertical slot 11', Figs. 18 to 20, over which the tape is adapted to be advanced in suitable time, and projecting upwardly through the slot from the bottom is a lower vise jaw 25, Fig. 6, of suitable length and in the form of a blade which has its upper edge preferably smooth, the blade being detachably secured to suitable arms 26 which are fixed on a shaft or rocker rod 27 rotatively mounted in the slide 13, this rod having fixed to its rear end, as shown in Fig. 4, a hub 28 having an upwardly extending arm which is provided at its upper end with a horizontally extending portion, one end of which, 29, extends toward the guide 10 while the opposite end extends away from the guide as at 30 and overhangs a rail 31 which is connected by suitable arms 32 to hubs 33, one of which is fixed to or forms a part of a sleeve 34 of suitable length having on its outer end 35, Fig. 5, an upwardly extending spindle 36 to receive a cam roller 37 which is adapted to engage a cam 38, Fig. 1, mounted on a cam shaft 39.

Arranged coplanar above the jaw 25 in the slot 11' of the frame 11 there is a coöperative jaw or blade 40, clearly shown in Figs. 4, 5 and 6, which extends longitudinally of the guide channel and is secured adjustably to a carrying arm 41 which has hub portions 42 which are loosely mounted upon the rock shaft 27 which carries the lower jaw 25, this carrying arm 41 extending rearwardly over and parallel to the rocker arm 27 and has at its rear end a rearwardly extending lug or arm 42' which is adapted to rest upon a horizontally extending rail 43 which is connected by means of arms 44 to a rocker shaft 45 upon which the hubs 33 of the adjacent rail 31 are loosely mounted, this rocker shaft 45 being provided at its outer end with an arm 46 carrying a cam roller 47 which is adapted to engage a complementary portion of the cam 38 which also operates the cam roller 37 of the lower jaw controlling rail 31.

Preferably the coplanar jaws 25 and 40 are arranged with their adjacent edges adapted to grip on opposite sides of an interposed strip of tape as it lies on the bottom of the channel way in the frame 11, the upper blade being provided with gripping teeth 40' to minimize the tendency of slipping of the tape and by presenting only point contacts, avoiding sticking to the jaw edge. Preferably these jaws engage the tape with yielding pressure, and this is secured by means of suitable yieldingly actuated presser pins, one of which is shown at 42' pressed downwardly by a spring 42ª which is mounted in a guide 50 in the form of an upwardly extending tubular socket which is formed on or secured upon a plate 51 which is detachably secured by screws or other suitable means 52 to the rear end of the carriage 13.

In a similar manner the lever arm 30 of the rock shaft 27 which actuates the lower jaw 25 is pressed down by a pin 30' which is actuated by a spring in a socket 30ª so that the upper jaw is yieldingly pressed upward when the rail 31 upon which the arm 30 rests is lowered. To control the relative position of the jaws 25 and 40 as they approach each other in the guideway 10 of the frame 11, suitable adjusting means as screws 52 are provided in the top plate 51, these screws being adjustable toward or from the adjacent overhanging portions of the respective lever arms 29 and 30 in an obvious manner.

In the operation of the coöperative jaws 25 and 40 these are adapted to be moved rearwardly into the guideway 10, while they are in a respective open or separated position with the lower jaw 25 drawn down below the bottom of the guideway 10 so as to freely pass beneath a strip of tape therein, while the upper jaw 40 is elevated a suitable distance above the surface of the tape to clear it. After the jaws have been drawn to their rearward limit of movement in the guideway 10 they are permitted to close upon the interposed piece of tape and then the carriage 13 upon which these jaws are mounted is adapted to be propelled forwardly by the actuation of the lever 16 through the proper cam so that the carriage is advanced forwardly while gripping the interposed piece of tape, and the latter is drawn into the rear end of the guideway over the roller 3 while the leading end of the tape is transferred from the guideway in a direction alined with the longitudinal axis of the guideway and is adapted to be placed upon a suitable affixing mechanism which is mounted for reciprocation toward and from the fixed guideway to approach the forwardly advancing carriage 13, and when the blades forming a vise on the carriage are properly positioned with respect to the rearwardly moved affixing device, means are provided for clamping one edge of the tape as it is held above the receiving plane on the affixing device so that then the tape may be advanced by the movement of the affixing mechanism to the point of application of the tape on a box to be bound in the machine.

This affixing mechanism is clearly illustrated in detail in Figs. 7, 8 and 9, and comprises a slide 55 which may be of suitable construction and is arranged for reciprocation in proper alinement in a guideway 56 forming a portion of the frame 11, the lower surface of the slide 55 being provided with a rack 57, Figs. 7 and 8, adapted to engage a pinion 59 mounted on a shaft 60 which is mounted in suitable bearings on the frame, this shaft extending transversely of the machine with relation to the line of feed of the tape, as shown in Fig. 2, and is provided with a pinion 61 adapted to mesh with a gear 62 which is secured on a gear shaft 63 having a pinion 64, Fig. 3, which is engaged by a rack 65 on the shank of a connecting rod or yoke 66 straddling the cam shaft 7, and which is adapted to be actuated through a cam 68 on shaft 67 so that the carriage 66 may be positively shifted rearwardly in proper time.

Projecting upwardly from the slide 55 there is shown a set of standards 69 and an end bearing or upright 70, the standards 69 being adapted to receive a pivot rod 71 upon which there is mounted a plurality of oscillating arms 72, these projecting downwardly from the pivot rod 71 and having cam rollers 73 on their lower ends while the upper ends of the arms 72 are provided with overhanging or clamp fingers 74 which are provided with operative gripping surfaces at their tips adapted to bear a section of the tape down upon a plate 75 which is secured to the top of the end standards 70 of the slide 55. The top of the plate 75 is designed to form a longitudinal plane substantially flush with the bottom of the channel or guideway 10 from which the tape is drawn by the reciprocating vise jaws 25 and 40, and arranged parallel to the plate 75 there is connected to the standard 70 an overhanging and longitudinally disposed plate 76, one edge of which is spaced in juxtaposition to the adjacent edge of the plate 75 so as to form a narrow longitudinal recess 77, Fig. 7, for the reception of the edge of the bottom of the box as indicated in dotted lines in this figure, while the ring of the box is adapted to rest circumferentially upon the top or plane surface of the plate 75 which is overhung by the fingers 74 of the affixer clamps. For the purpose of controlling the opening and closing action of the clamp fingers 72 these latter are adapted to be pressed downwardly at their lower portions automatically by means of respective springs 78 arranged in suitable sockets therefor provided in the upper portion of the slide 55, these springs 78 tending to rock the lower ends of the fingers 72 outwardly and bear the overhanging gripping portions downwardly upon the top surface or plane of the plate 75 when the vise plates have carried a strip of tape into superposed position above the plates 75 and 76 of the sliding affixer when the latter has been moved backwardly through means of its actuating mechanism to a position adjacent the fixed guide 10 on the frame 11 at which time the structure, forming the carriage and the vise blades, has been advanced so that the front end of the carriage or vise structure abuts the rear end of the affixer as shown in Fig. 18, thus insuring for the positive emplacement of a strip of tape as it is advanced by the vise jaws over the affixer at which time the clamp fingers 72 may be released to secure one edge of the paper on the plate 75 while the vise jaw 40 is maintained at rest by its cam slightly above the plane of the affixer and the lower jaw is lowered so as to prevent the gripped edge of the paper between the vise jaws from being depressed into the longitudinal groove or channel 77, and thereby effectually preventing the upwardly curling or bending action of the strip of tape as it is arranged over the affixer. The springs 78 are preferably of greater strength successively along the affixer so that the last one to release is the strongest of the series as it is the only one effective when the preceding fingers have been lifted. When the carriage has been moved to the position shown in Fig. 20 through the action of the cam 21 indicated in Fig. 2, the forwardly advanced end of the tape carried by the vise blades or jaws is adapted to be severed by suitable cutting means so that the leading end of the severed section of the tape may then be passed to a position over the affixer to be clamped thereon. The tape is then clamped down and the vise and affixer given a synchronous forward movement by cam 68.

Various forms of cutting mechanism may be utilized, and, in the present instance, is illustrated in Figs. 12 and 13 as comprising an upper cutting blade 80 affixed to a blade head 81 on the end of an arm 82 which is secured on a rocker shaft 83 mounted for oscillation in a journal 84 which is attached to or formed upon one side of the frame 11, the rocker shaft 83 extending through the journal 84 and carrying a pinion 85, and also carrying at its outer end a lever arm 86 provided with a cam roller 87 adapted to engage a cam 88, Fig. 1, the function of which is to oscillate the lever arm 86 in proper time so as to swing the knife blade 80 downwardly into coöperation with a blade 90 which is secured upon the outer end of a lever arm 91 having a hub portion 92 pivotally mounted upon a fixed stud 93 below the journal 84 of the upper rocker arm. The concurrent motion of the lever arms 82 and 91 of the cutting mechanism is secured through the meshing of the pinion 85 on rock shaft 83 with a pinion 85' secured on the hub 92 of the lower blade 91. After the strip has been cut through the action of the cutters 80 and 90, the vise jaws or blades with their carriage are advanced progressively and synchronously with the affixer slide 55 and the latter caused to carry a clamped tape forwardly into position beneath the box being bound. For the purpose of preventing the leading or "pick up" end of the tape from sticking or jamming with the adjacent surface of the affixer plates 75 and 76 as the tape is carried over the affixer by the vise, and to permit the tape to be free from tensional strain until the initial short length has been firmly affixed to the box, this leading end of the tape is preferably supported in an elevated position on the up-lifted lower jaw through means of an auxiliary gripping device or what will be hereinafter termed as a smoother which is clearly illustrated in Fig. 4 as comprising a pawl 95 which is pivoted at 96 on the upper and forward end of the upper blade 40 of the vise and is pressed yieldingly downward by a spring 97 so that the interposed leading end of the tape is held against the foremost end of the lower blade or jaw 25 while this latter passes into the slot 77 between the plates 75 and 76 on the top of the affixer. When the vise blades have been moved to their foremost position with respect to the affixing position of the tape where the box is being turned through means of the mandrel 125 for the purpose of preventing the "pick up" end of the tape from being pressed down on the plates 75—76 of the affixer rather than to the box as the lower jaw of the vise 25 is lowered through the action of the cam mechanism, there is provided on the top surface of the affixer plate 76 a cam plate 76', Fig. 11, which is adapted to engage with a roller indicated in dotted lines at 95' so that the smoother 95 is supported in an elevated position above the top plane of the plates 75—76 until the leading end of the tape is securely affixed to the rotating box ring, and then as the affixer slide 55 moves forwardly the cam plate 76' is withdrawn from under the roller 95' of the smoother and the latter is then allowed to press down upon the tape and smooth this out upon the plates 75 and 76 of the advancing affixer members to smooth out wrinkles and place the tape under tension as it is drawn by the rotating box upwardly from the surface of the affixing plates 75 and 76.

In the operation of the affixing device as the slide 55 is moved rearwardly to the cutting position of the mechanism and in a position to receive a portion of the tape as it is advanced by the vise blades, it is necessary to lift the gripping ends 74 of the clamp fingers 72 of the affixer so as to permit the arrangement of the tape in superposed position above the plates 75—76 of the affixing device, and to that end the fingers 72 must be mechanically swung inwardly at their lower ends against the action of their springs 78 to cause the opening of the clamping ends 74 and this opening movement is secured through the medium of a cam rail 100, Figs. 7, 8 and 9, which is shown as secured upon the lower ends of a pair of arms 101 which are secured at their upper ends to a rock shaft 102 mounted in suitable bearings 103 on the frame 11, the rock shaft being provided with a laterally extending lever arm 104 carrying a cam roller 105 at its outer end adapted to engage a cam 106 which in the present instance is shown in Fig. 1 as being formed in the cam wheel which carries the cam 88 for actuating the cutters, although obviously this cam 106 may be arranged in any other suitable manner and position. When the affixer moves rearwardly the cam 106 throws the cam rail 100 inwardly at the lower ends of the clamp fingers 72, and as these fingers are carried rearwardly the cam rolls 100' located thereon ride onto the inwardly swung cam rail 100 and the clamping ends 74 of the fingers are lifted to a position in which they are all open at the same time. Then when the tape has been positioned above the plates 75—76 by the advanced vise the cam 106 operates to withdraw the cam rail 100 so that the springs 78 automatically swing the finger gripping portions 74 downwardly upon the interposed and adjacent side of the strip of tape, and this is thereby clamped to the plate 75 and its alinement positively secured and relative slipping and wrinkling is eliminated. Obviously as the affixer device moves forwardly toward the affixing position at which the tape is applied to the rotating box it is necessary to successively lift the gripping ends 74 of the fingers so that the tape may be clear itself from the top plates 75—76 of the affixing device as it is taken up by the rotating box, and this successive release of the gripping finger ends 74 is secured through means of a fixed cam 110, Figs. 8 and 9, disposed in the path of the rolls 100' as they are carried forwardly with the moving affixer, the operative end of the cam 110 reacting against the first finger as the latter engages the cam so that the clamping portion 74 is released as the tape is taken up by the box, and then in successive order the following fingers are tilted to release the tape until the whole length has been disengaged from the affixer plates and wound onto the rotating box. Fastened by screws or other means 114 on the end of the rail 100 is a bridge plate 111 onto which the fingers pass as the clamps are moved back rearwardly from the adjacent cam 110 on to the cam rail 100.

From the foregoing it will be seen that we have provided through means of the guide 10 for the true longitudinal alinement of a continuous piece or length of tape as it is advanced into the guideway 10 of the mechanism, and further have provided for the true alinement of the tape as it is advanced from the guide or guideway 10 by the vise to the affixing mechanism, and have further provided for the prevention of disalinement by lateral shifting and wrinkling of the tape through means of a series of clamps on the affixing device, all of which operate to control the alinement of the tape from the time it is led into the guide 10 until it is finally applied to the box section being wound.

In addition to these means for controlling the alinement of the tape continuously during its passage through the machine to the box it is also desirable to prevent accidental shifting longitudinally of the tape, and to provide means for taking up the slack which may occur for any reason in the length of the tape, and these purposes are accomplished through means of suitable gripping devices which are shown in Figs. 4 and 5 as involving a presser finger 115 which is mounted upon a rocker shaft 116 supported in an upright bearing 117 at one end of the guide 10 and on the side of the frame 11, this finger having the function of bearing down upon the introduced tape in the guide to prevent its rearward movement when the guide wheel 3 is swung rearwardly during a take-up movement of the lever 4. But for the purpose of preventing the unnecessary friction of the finger 115 on the tape in the guide 10 when the vice is advancing to transfer the tape from the guide to the affixing mechanism, it is preferable to lift the finger at such time, this being accomplished through means of a cam lever 121 which is pivoted at 120 on the side of the frame 11 and which at its rear end engages a lever 122 fixed on the end of the rocker shaft 116 of the finger 115 so that the finger is lifted against the tension of its actuating spring 123, one end of which is connected to an arm 124 and the opposite end of which is connected to any suitable fixed point as a pin 123'. The lever 121 is provided with a downwardly extending arm 126 bearing a roller 127 which is shown in Fig. 1 as engaging a complementary cam portion on the cam wheel 88.

For longitudinal tensioning of the strip of tape as it advances through and rests in the guide 10, there is also provided a tensioning device in the form of a pawl 130, Figs. 4 and 5, which is mounted upon a rocker shaft 131, the latter being connected to a tensioned spring 132 the opposite end of which is secured to the pin 123¹ for convenience. The swinging end of the tensioned pawl 130 is adapted to press the interposed strip of tape downwardly into a recess 133 formed in the bottom of the guide, the strength of the spring 132 being such that it will bear the finger or pawl 130 lightly onto the upper surface of the interposed tape and thus longitudinally tension the latter to take up any slight slack that may exist and thus prevent transverse wrinkling of the tape. In addition to the foregoing the pawl 130 by depressing the tape in the recess 133, also acts to pull the tape rearwardly from the upper knife to which it sometimes sticks and as the knife moves up it might carry this end of the tape with it and disaline it, as the tape is held in the rear of guide 10 by finger 115 against a forward pull it is obvious that the front end will pull back as the tape is depressed in the recess. To prevent the forward end of the tape from curling up and being caught by the rearwardly moving jaws, there is provided adjacent the forward end of the guide 10 another pawl 140 to press down upon the forward end of the tape and hold it from being drawn into the guideway or guide 10 through the action of the tensioning finger 130. In operation after the affixer has been moved rearwardly into proper position to coöperate with the vise to receive the leading portion of the tape from the guide 10 and to be in proper position to hold the tape while it is being cut through the action of the cutters 80 and 90, it is then desirable that the affixer be led forwardly, and while this forward movement is taking place the mandrel 125, which is adapted to turn or rotate the box, is preferably rotated at a speed slightly greater than the linear rate of advance of the affixer so that the tape is taken up and given a slight tension as it is lifted from the affixer surface, this being for the purpose of avoiding any creasing of the paper as it is laid on the box and to prevent transverse wrinkling, and to that end the mandrel 125 is adapted to be rotated in proper time with relation to the movement of the affixer, and such timing is secured in the present instance through means of a gear mechanism which is clearly illustrated in Figs. 1 and 2 in which there is provided on the shaft 60 a pinion 150 which is adapted to mesh with a rack 151 formed on the lower portion of a slide 162 which carries on its upper portion a rack 163, this being adapted to mesh with a pinion 164 for rotating the mandrel 125. The rotation of the mandrel is secured when the latter is shifted from the position shown in Fig. 2 to a position beneath the slide S in which the parts are assembled, the longitudinal shifting of the mandrel being secured through any suitable cam mechanism as is illustrated at 125', Fig. 1. When the mandrel has been shifted to the position to assemble the parts the gear 164 is intermeshed with the rack 163 and then the gear is released from the control of a suitable locking mechanism, including a bar 165, which engages an adjacent cam 165' to hold this against rotation when it is in the retracted position as in Fig. 2 where the ring is discharged from the mechanism. The locking bar 165 is shown as connected to a rocker arm 166 which is pivoted at 167 on a bearing 168, the rocker arm having a rearwardly extending lever 169 provided with a roller 170 operating on a cam 171 on cam shaft 39, and by which cam the locking bar 165 is adapted to be thrown out of locking relation to the cam 165' when the pinion has been intermeshed with the rack 163, and thereby permit the rotation of the mandrel at the proper speed and time as the affixing device moves forwardly.

During the operation of affixing the tape to the box section the French edge, as it is termed, of the cap or top of the box, rotates in the groove 77 of the affixer, and for the purpose of giving a final smooth finish to the trailing end of the tape as it is wound upon the box to finish what is known as the horn at the latter end of the tape, there may be provided a suitable means for finally crimping the tape around the projecting or French edge of the box as the horn passes from the affixing mechanism, and this is effectually secured by providing on one of the affixer plates 75 or 76 means for relatively decreasing the distance between the adjacent edges of these plates at the end of the slot 77, as shown in Fig. 8. This is obtained by fastening to the plate 75, for instance, a crimper 75', the inner edge of which is so disposed with relation to the adjacent edge of the opposite plate 76 as to subject the French edge of the box on both sides at the zone of the fillet of the lapping end or horn of the box to slight additional pressure so that it is snugly lapped down onto the underlying surface of the tape on the box. Any desired pressure may be given for this purpose by adjusting the plate 76 against the bottom of the box. This is done by means of the two adjusting screws 76$^b$, Figs. 8 and 9 by screwing one in and the other out and then locking them with the center and top screws 76$^c$. This plate 76 also serves to turn the projecting paper about the bottom. Means for turning in the other projecting edge of paper into the box and flattening down the paper on both ends of the box are shown in the Patent No. 1,006,885.

Preferably, the plate 25 has at its ends planes which are slightly above the general longitudinal plane of the plate so that the tape when being "picked up" by the rotating box, receives pressure between the elevated surfaces so as to insure the firm application of the leading end to the trailing end of the section of tape to the box. This initial pressure however, is preferably relieved after the starting end of the tape has been applied to the box ring so that the peripheral over travel above mentioned is permitted to draw or stretch the top tightly on to the box without pressure from the surface of the plate between its ends and thereby avoiding straining, cracking or breaking it as would be the case if the pressure was continuously applied along the surface of the plate as the tape was rolled on to the box. As the end of the plate is approached, its slightly elevated surface comes into effect to snugly press the trailing end tape to the box. This relative elevation of the end planes of the box with relation to the intermediate plane extending longitudinally thereof is preferably very slight and is therefore not indicated in the present drawing.

What is claimed as new is:

1. In a machine of the class described, box assembling means including a rotary mandrel, a channel guide with a flat tape supporting surface in a plane tangential to the mandrel for longitudinally alining a tape as it advances to the box rim on said mandrel, and means for positively gripping at points along its length and transferring the tape in a plane from the alining guide to the point of application to the box rim.

2. In a machine of the class described, box assembling means, a fixed guide arranged tangential to a box rim in the said means to longitudinally aline a binding tape, and means for positively gripping the tape at points along its length, and transferring the alined tape in the direction of its length and flatwise to the box circumference from said tangential guide.

3. In a machine of the class described, box assembling means including a rim mandrel, a fixed guide arranged to longitudinally aline a binding tape in a tangential plane of the box rim, and means for positively gripping and transferring the tape flatwise from the guide to the box circumference, and holding it against edgewise movement, said last named means including devices for engaging the tape at points along its length.

4. In a machine of the class described, a box assembling means, a guide for alining the binding tape in a plane longitudinally, and means for gripping the tape at points along its length and thus holding it against lateral movement and for transferring it to the assembling means.

5. In a machine of the class described, box assembling means, a guide for alining the binding tape in a plane, and an affixer movable back and forth between said means for gripping the tape and advancing it from the guide to the box and for releasing it progressively as the affixer passes the box.

6. In a machine of the class described, box assembling means, a guide for alining the tape in a tangential plane of the box therein, and reciprocating means for lengthwise gripping and advancing the tape from the guide to the box and for releasing the tape progressively as it is affixed to the rotating box.

7. In a machine of the class described, box assembling means, a guide for alining tape longitudinally in a tangential plane of the box therein, and means for gripping the tape at points along its length and advancing it to the rotating box.

8. In a machine of the class described, box assembling means, a guide for alining tape longitudinally in a tangential plane of the box therein, and means for gripping the tape points along its length and advancing it to the rotating box and releasing it at the box as it is affixed thereto.

9. In a machine of the class described, box assembling means and means coöperative therewith for receiving the tape longitudinally to advance it lengthwise to the rotating box therein and continuously grip the advancing tape along its length until it is affixed to the box circumference whereby disalinement is obviated.

10. In a machine of the class described, a guide having a guideway for alining the tape longitudinally, a reciprocating affixer with a receiving plane longitudinally alining and flush with the guideway bottom, box assembling means between which and the guide the affixer reciprocates, and means for gripping the tape at points along its length for longitudinally advancing the tape from the guide to said affixer.

11. In a machine of the class described, a guide having a guideway for alining the tape longitudinally, a reciprocating affixer with a receiving plane longitudinally alining and flush with the guideway bottom, box assembling means between which and the guide the affixer reciprocates, and reciprocating means for gripping the tape at points along its length for longitudinally advancing the tape from the guide to said affixer.

12. In a machine of the class described, a guide having a guideway for alining the tape longitudinally, a reciprocating affixer with a receiving plane longitudinally alining and flush with the guideway bottom, box assembling means between which and the guide the affixer reciprocates, and means for gripping and advancing the tape from the guide to said affixer, the affixer having a series of spaced independent gripping fingers.

13. In a machine of the class described, a guide having a guideway for alining the tape longitudinally, means for controlling the tape therein, a reciprocating affixer with a receiving plane longitudinally alining and flush with the guideway bottom, and means movable in a path parallel to the plane of the tape guide bottom and the tape plane of the affixer for longitudinally advancing the tape from the guide to said affixer substantially without change of its plane.

14. In a machine of the class described, a guide having a guideway for alining the tape longitudinally, a reciprocating longitudinally slotted affixer with a receiving plane longitudinally alining and flush with the guideway bottom, means including upright gripping blades movable endwise into the guide and affixer for longitudinally advancing the tape from the guide to said affixer, and means for severing the leading portion of the tape after it has been positioned upon the affixer.

15. In a machine of the class described, box assembling means, a reciprocating affixer, a longitudinal guide having a channel to receive the tape between which and the said means the affixer moves, and a reciprocating carriage coördinate with the guide having means for gripping the tape lengthwise thereof, and by movement between the guide and the affixer advancing the tape in the guide, lifting it therein for adjustment upon and leading it to the affixer by which it is applied at the said assembling means.

16. In a machine of the class described, box assembling means, a longitudinal guide having a channel to receive the tape, an affixer reciprocative between the guide and the said means, and a reciprocating carriage coördinate with the guide and having opposed blades for longitudinally gripping the tape, lifting it from the channel and advancing it for adjustment upon the affixer by which it is applied at said means.

17. In a machine of the class described, box assembling means, a longitudinal guide having a channel to receive the tape, a reciprocating carriage, an affixer coöperating with the carriage to transfer tape to the said means, said carriage having opposed blades for longitudinally gripping the tape in the guide and advancing it to the affixer, and means at one end of the jaws for gripping the tape in the event of undue separation of the jaws during feeding movement.

18. In a machine of the class described, box assembling means, a tape guide, a reciprocating affixer alined therewith and operating between said guide and said means to apply tape at the latter, and means for drawing tape into the guide and transferring it to the affixer, and comprising jaws to longitudinally grip the tape, lift it from the guide, hold it elevated, and then deposit it upon the affixer as the latter leads the "pick up end" of the tape under the box.

19. In a machine of the class described, a tape guide, a pair of vise jaws arranged to enter the guide and grip the tape upon opposite sides, a reciprocating affixer alined with the guide and provided with a slot to receive the jaws, the latter operative to carry the tape over and spaced above the affixer to a given position and to then deposit the tape in alined position on the affixer, and box assembling means coacting with the affixer for the application of the tape to the box.

20. In a machine of the class described, a tape guide, a pair of vise jaws arranged to enter the guide and grip the tape upon opposite sides, a reciprocating affixer alined with the guide and provided with a slot to receive the jaws, the latter operative to carry the tape over and spaced above the affixer to a given position and to then deposit the tape in alined position on the affixer, the jaws preventing disalinement of the tape during its transfer from the guide to the affixer, and box assembling means coacting with the affixer for the application of the tape to the box.

21. In a machine of the class described, a tape guide, a pair of vise jaws arranged to enter the guide and grip the tape upon opposite sides, a reciprocating affixer alined with the guide and provided with a slot to receive the jaws, the latter operative to carry the tape over and spaced above the affixer to a given position and to then deposit the tape in alined position on the affixer, the jaws preventing disalinement of the tape during its transfer from the guide to the affixer, and means on the affixer for holding the tape in alinement up to the point of application to the box and box assembling means coacting with the affixer for the application of the tape to the box.

22. In a machine of the class described, a guide having a longitudinal channel to aline the tape, a vise having longitudinally extending and opposed jaws, means operative to close the jaws upon the tape in said channel, means for reciprocating the vise longitudinally of the guide, an auxiliary member on one jaw to grip the leading end of the tape, and an affixer upon which the tape is placed by the advanced vise.

23. In a machine of the class described, a guide having a longitudinal channel to aline the tape, a vise having longitudinally extending and opposed jaws, means operative to close the jaws upon the tape in said channel, means for reciprocating the vise longitudinally of the guide, an auxiliary member on one jaw to grip the leading end of the tape, and an affixer upon which the tape is placed by the advanced vise, said affixer having means for upholding the auxiliary member until the "pick up" end of the tape is affixed to the box.

24. In a machine of the class described, a guide having a longitudinal channel to aline the tape, a vise having longitudinally extending and opposed jaws, means operative to close the jaws upon the tape in said channel, means for reciprocating the vise longitudinally of the guide, an auxiliary member on one jaw to grip the leading end of the tape, and an affixer upon which the tape is placed by the advanced vise, said affixer having means for upholding the auxiliary member until the "pick up" end of the tape is affixed to the box, and then release said member to permit it to tension and smooth the tape at the affixing point.

25. In a machine of the class described, means for rotating assembled box sections, and an affixing device for applying gummed tape thereto having means for gripping the tape at points along its length and for holding the tape in alinement as it advances to the said rotating means.

26. In a machine of the class described, means for rotating assembled box sections, and an affixing device for applying gummed tape thereto having means for holding the tape in alinement as it advances to the said rotating means, and operative to progressively release the tape at the affixing point.

27. In a machine of the class described, means for rotating assembled box sections, and an affixing device for applying gummed tape thereto having yieldable means for gripping the tape at points along its length and for holding the tape in alinement as it advances to the said rotating means.

28. In a machine of the class described, a reciprocating affixer having a plane surface to receive a tape, and means to clamp one marginal side of the tape to said surface to prevent wrinkling of the tape as it is applied to the box.

29. In a machine of the class described, a reciprocating affixer having a plane surface to receive a tape, means for rotating assembled box sections to which the tape is applied by the affixer, means to clamp one marginal side of the tape to said surface to prevent wrinkling of the tape as it is applied to the box, and means for progressively actuating said means to release the tape as it is applied.

30. In a machine of the class described, a reciprocating affixer having a plane surface to receive a tape, means for rotating assembled box sections to which the tape is applied by the affixer, and means to clamp with pressure of increasing force along said plane to the rear end of the affixer one marginal side of the tape to said surface to prevent wrinkling of the tape as it is applied to the box.

31. In a paper box machine, an affixer having a plane surface to pass adjacent to the box rim, and a series of fingers or grippers spaced longitudinally of the plane to grip the tape along its length.

32. In a paper box machine, an affixer having a plane surface to pass adjacent to the box rim, and a series of yieldable fingers or grippers spaced longitudinally of the plane to grip the tape along its length.

33. In a paper box machine, an affixer having a plane surface to pass adjacent to the box rim, and a series of fingers or grippers spaced longitudinally of the plane to grip the tape along its length, and means for successively actuating the fingers to release the tape as it is applied to the box.

34. In a paper box machine, an affixer having a plane surface to pass adjacent to the box rim, and a series of fingers or grippers spaced longitudinally of the plane to grip the tape along its length, the fingers applied to the tape by springs, one for each, with pressure increasing progressively toward the trailing end of the piece of tape.

In testimony whereof we affix our signatures.

ALOYSIUS JOSEPH KUSTERER.
CHARLES SANDERS.

Copies of this patent may be obtained for five cents each, by addressing the "Commissioner of Patents, Washington, D. C."